(12) United States Patent
     Toon

(10) Patent No.: US 12,667,151 B2
(45) **Date of Patent: \*Jun. 30, 2026**

(54) FRACTAL ALGORITHM BRANCHING MOUNTING SYSTEM FOR DISTRIBUTED FUNCTIONAL CELLS

(71) Applicant: Michael Simon Toon, Venice, CA (US)

(72) Inventor: Michael Simon Toon, Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/202,719

(22) Filed: May 8, 2025

(65) Prior Publication Data

US 2025/0261715 A1     Aug. 21, 2025

Related U.S. Application Data

(63) Continuation of application No. 18/077,179, filed on Dec. 7, 2022, now Pat. No. 12,329,222.

(51) Int. Cl.
    *A41G 1/00*      (2006.01)
    *H02S 10/12*     (2014.01)
    *H02S 20/30*     (2014.01)

(52) U.S. Cl.
    CPC .............. *A41G 1/007* (2013.01); *H02S 10/12* (2014.12); *H02S 20/30* (2014.12)

(58) Field of Classification Search
    CPC .......... A41G 1/007; H02S 10/12; H02S 20/30
    See application file for complete search history.

(56) References Cited

U.S. PATENT DOCUMENTS

| | | | | | |
|---|---|---|---|---|---|
| 4,359,737 | A | * | 11/1982 | Bond | H01Q 17/008 |
| | | | | | 342/3 |
| D475,320 | S | * | 6/2003 | Hensley | D11/118 |
| 7,888,584 | B2 | * | 2/2011 | Lyden | H02J 7/35 |
| | | | | | 136/244 |
| 9,103,567 | B2 | * | 8/2015 | Dwyer | F24S 30/45 |
| 9,228,785 | B2 | * | 1/2016 | Poltorak | H05K 7/20509 |
| 10,527,368 | B2 | * | 1/2020 | Poltorak | F28F 21/02 |
| 11,088,653 | B1 | * | 8/2021 | Gupta | F03G 6/045 |

(Continued)

FOREIGN PATENT DOCUMENTS

| | | | | |
|---|---|---|---|---|
| CN | 104266129 A | * | 1/2015 | F21V 33/00 |
| CN | 204114810 U | * | 1/2015 | |

(Continued)

OTHER PUBLICATIONS

Tree of Water and Power online page at http://treeofwaterandpower. com dated by archive.org at Jun. 19, 2021 (Year: 2021).*

(Continued)

*Primary Examiner* — Terrell L McKinnon
*Assistant Examiner* — Ding Y Tan

(57)                ABSTRACT

In methods and apparatuses that disclose a combination solar and wind electricity generating apparatus; an apparatus for the mounting and distribution of components, consisting of several or more sizes and shapes of connectors which allow tubes of scaling sizes to be connected at specific angles relative to each other, and which allow those components to be installed where the tubes terminate, substantially as and for the purpose set forth.

10 Claims, 5 Drawing Sheets

(56)             References Cited

U.S. PATENT DOCUMENTS

| | | | | |
|---|---|---|---|---|
| 2006/0011194 | A1* | 1/2006 | Hensley | H10F 19/00 |
| | | | | 126/655 |
| 2010/0158673 | A1* | 6/2010 | Keene | F03D 3/0436 |
| | | | | 415/121.3 |
| 2010/0289269 | A1* | 11/2010 | Christy | F03D 1/02 |
| | | | | 136/246 |
| 2011/0139215 | A1* | 6/2011 | Lyden | H02S 20/10 |
| | | | | 136/244 |
| 2012/0260967 | A1* | 10/2012 | Dwyer | F24S 30/45 |
| | | | | 257/E31.113 |
| 2012/0285660 | A1* | 11/2012 | Poltorak | H05K 7/20509 |
| | | | | 165/104.11 |
| 2013/0240024 | A1* | 9/2013 | Kim | H02S 20/10 |
| | | | | 136/251 |
| 2014/0021723 | A1* | 1/2014 | Christy | F03D 9/007 |
| | | | | 290/55 |
| 2014/0305497 | A1* | 10/2014 | Petrosillo | H02S 20/00 |
| | | | | 415/4.2 |
| 2017/0040927 | A1* | 2/2017 | Collins | H02S 20/20 |
| 2017/0157523 | A1* | 6/2017 | Jabr | A63H 33/048 |
| 2017/0250646 | A1* | 8/2017 | Lasry | H02S 20/10 |
| 2020/0044453 | A1* | 2/2020 | Lyden | H10F 19/00 |
| 2024/0171120 | A1* | 5/2024 | Miyashiro | H02S 40/32 |

FOREIGN PATENT DOCUMENTS

| | | | | | |
|---|---|---|---|---|---|
| CN | 205597220 | U | * | 9/2016 | |
| CN | 209105073 | U | * | 7/2019 | |
| CN | 110323995 | A | * | 10/2019 | H02S 40/36 |
| CN | 209709740 | U | * | 11/2019 | |
| CN | 113872498 | A | * | 12/2021 | H02S 10/00 |

OTHER PUBLICATIONS

Dr Katie Spalding online article titled "Brand New Fibonacci Sequence Discovered By Accident in Attempt to Harvest Sun Light" published on Mar. 9, 2022, https://www.iflscience.com/brand-new-fibonacci-sequence-discovered-by-accident-in-attempt-to-harvest-sunlight-62899 (Year: 2022).*

Yashwanth et al. Aug. 2021 paper in International Journal of Microwave and Wireless Technologies 14(5) titield "A Review on Microstrip Patch Antenna Parameters of different Geometry and Bandwidth Enhancement Techniques" (Year: 2021).*

Cadence systems analysis blog post titled "Ultra-wideband antenna application in communication systems" dated Nov. 1, 2021 by web.archive.org https://resources.system-analysis.cadence.com/blog/msa2021-ultra-wideband-antenna-applications-in-communication-systems (Year: 2021).*

Rhett Allain article titled "How to Make a Tree with Fractals" in wired.com dated Jan. 3, 2020 https://www.wired.com/story/how-to-make-a-tree-with-fractals/ (Year: 2020).*

Wei Cao et al.technical paper titled "Natural Tree Modeling Based on Fractal" dated 2009 https://ieeexplore.ieee.org/document/5359862/similar#similar (Year: 2009).*

Sim YH, technical paper in 2020 "Fractal solar cell array for enhanced energy production: applying rules underlying tree shape to photovoltaics." Proc. R. Soc. A 476: 20200094 published Jul. 29, 2020, https://royalsocietypublishing.org/doi/10.1098/rspa.2020.0094 (Year: 2020).*

Boston's Treepods by Influx_Studio article on ArchDaily discloses an artificial tree for performing $CO_2$ scrubbing. dated Mar. 8, 2011 https://www.archdaily.com/118154/bostons-treepods-influx_studio (Year: 2011).*

TWP EL test vimeo video dated Oct. 21, 2020, https://vimeo.com/470828623 (Year: 2020).*

TaeSoo Kim and Taejun Cho "Patent Technologies in an Artificial Tree" pp. 125-133, Recent Patents on Engineering, 2017, vol. 177, No. 2 (Year: 2017).*

* cited by examiner

AREA OF Ø A + AREA OF Ø B < AREA OF Ø C

HOLLOW PINS FOR POWER/DATA/COMMS

BRANCH CONNECTOR

BRANCH CONNECTOR

BRANCH CONNECTOR

BRANCH CONNECTOR

FUNCTIONAL CELL/COMPONENT

TERMINATING CONNECTOR FOR 7-CELL ARRAY

SHAFT/TUBE/HOLLOW PIN

FRACTAL ALGORITHM BRANCHING MOUNTING SYSTEM FOR DISTRIBUTED FUNCTIONAL CELLS

CROSS-REFERENCE TO RELATED APPLICATIONS

The present application is a continuation of pending U.S. patent application Ser. No. 18/077,179, filed Dec. 7, 2022, which is incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

Be it known that I, Michael Simon Toon, have invented a new and useful improvement in the field of apparatus that supports functional cells or components that derive benefit from maximized surface area, doing so more efficiently than any existing mounting system, requiring vastly fewer individual components and up to 90% less physical materials in mass and volume than any traditional apparatus currently employed. I do hereby declare that the following is a full, clear and exact description thereof.

(1) FIELD OF THE INVENTION

My invention relates to methods and apparatuses that perform, either as a single installation, or in groups of multiple installations. It does so with significant material and cost benefits, and can be deployed with greater speed and efficiency than any existing system. The functions of these mounted cells or components that would benefit from increased surface area may include, but are not limited to, communications, energy generation, energy storage, communications, lighting, sensors, condensation capture, shade creation, wildlife habitat, or any solid-state device.

BRIEF SUMMARY OF THE INVENTION

To these ends the invention consists, generally, the manufacture of materials that comprise an interlocking structure that when assembled, creates a branching system based on a scaling fractal algorithm. These materials comprise a combination of components which includes a series of scaled connectors designed by the inventor, which allow shafts in any material, of a specific series in varying scales, either solid or hollow, to connect to at least two other shafts with different diameters on that scale series; and a terminating connector which mounts the cells/components themselves either individually or in an array formation, either at the end of the smallest diameter shaft in the series, or at any point on the installation.

The greater part of the installation using this system is comprised of these shafts, which may also be described as rods if they are solid, or tubes if they are hollow, which could be made of metal, polymer, carbon fiber, fiberglass, or any structurally suitable material, and are readily available as stock materials; the system, created by the inventor, could be described as a method of efficiently and comprehensively interlocking these shafts of a series in varying scales, whereby after installation, a branching system is produced, according to a scaling fractal algorithm, that allows the mounting of many components/cells of a small size, which are small enough to support themselves structurally without added reinforcement. This is in contrast to traditional and existing mounting systems which may support one large single cell or component, which would require structural reinforcement due to its larger size. The scaling fractal algorithm, as the term suggests, first scales in size, then branches at two or more angles, and then rotates. It is this repeated scaling and rotating at a specific angle to produce a greater overall form that characterizes a fractal.

BRIEF DESCRIPTION OF SEVERAL VIEWS OF THE DRAWING(S)

To enable others skilled in the art to make and use our invention, I will describe the same, referring to the accompanying drawings, in which FIG. 1 is a cross-sectional diagram of branch connector with pins and shafts.

REFERENCE NUMERALS IN THE DRAWINGS

Figures 1, 2, 3:
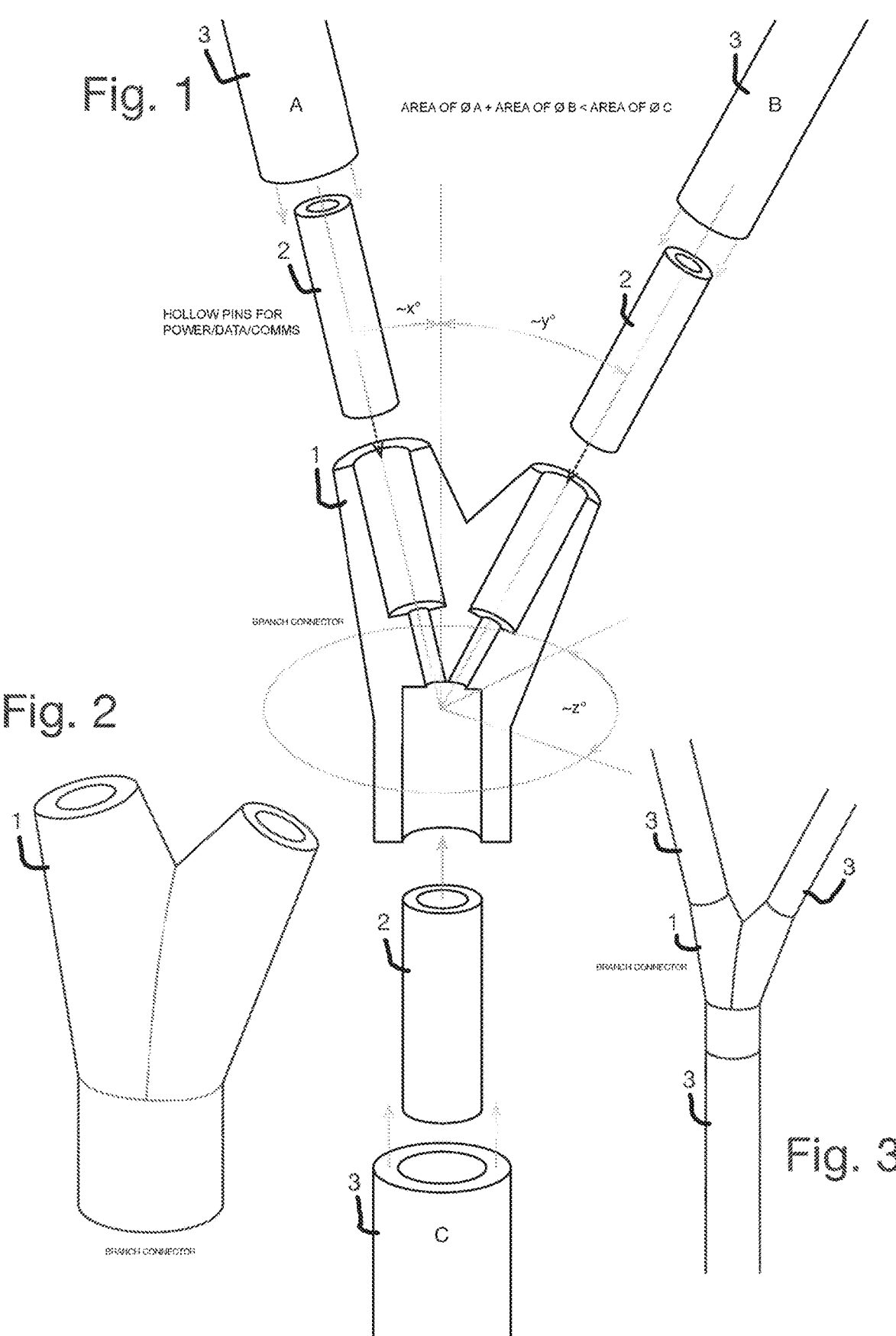
FIG. 2 is a branch connector.
FIG. 3 is a branch connector connected to shafts.
Figure 4:
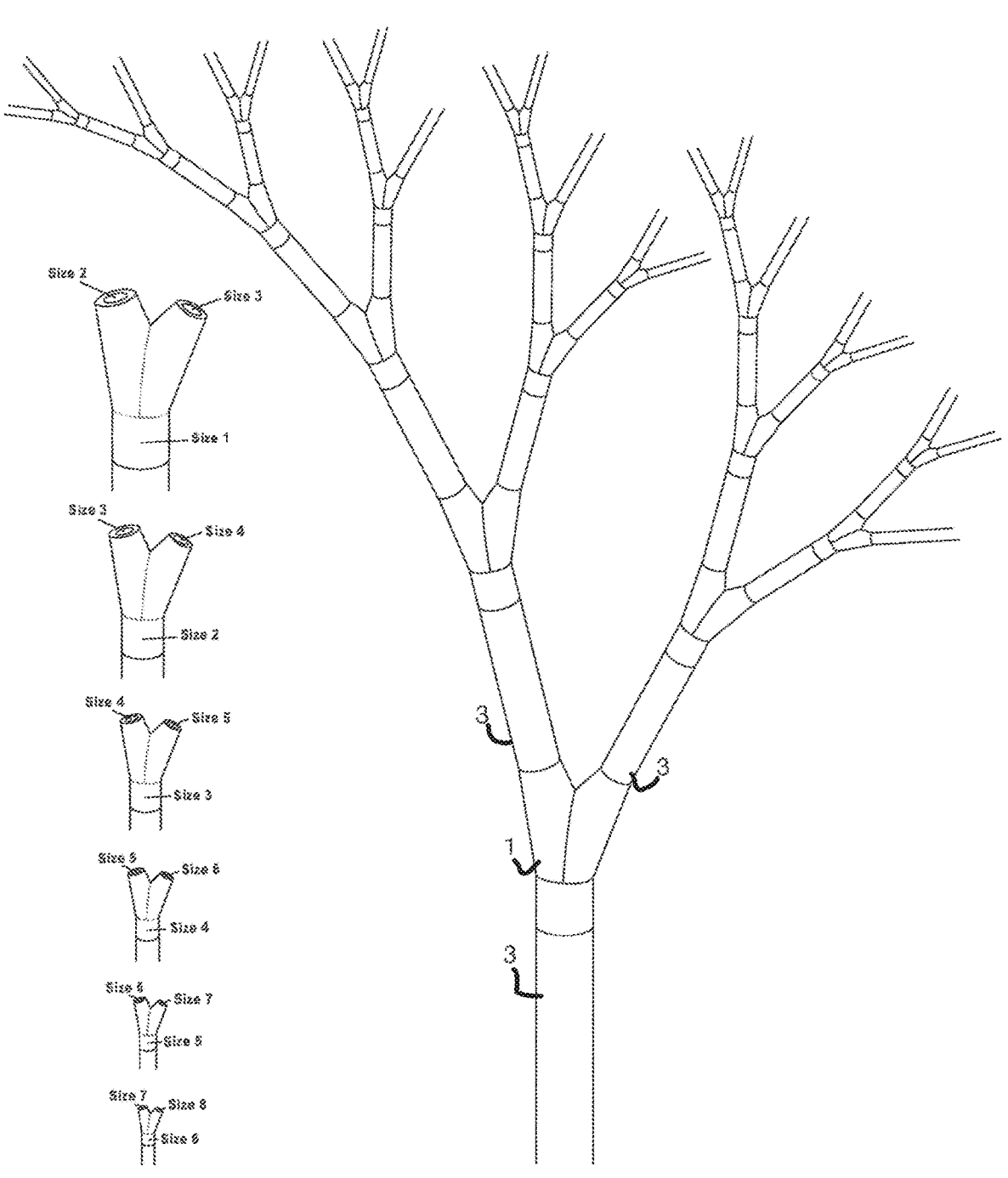
FIG. 4 is a series of branch connectors connected to shafts (without rotation).
Figure 5:
FIG. 5 is a side elevation of actual model of completed installation (with rotations).
Figure 6:
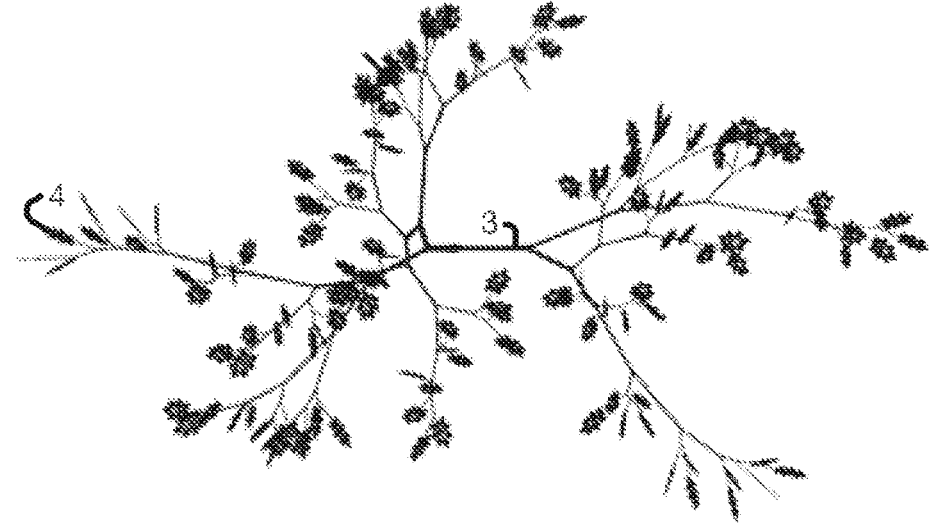
FIG. 6 is a top elevation of actual model of completed installation (with rotations).
Figure 7:
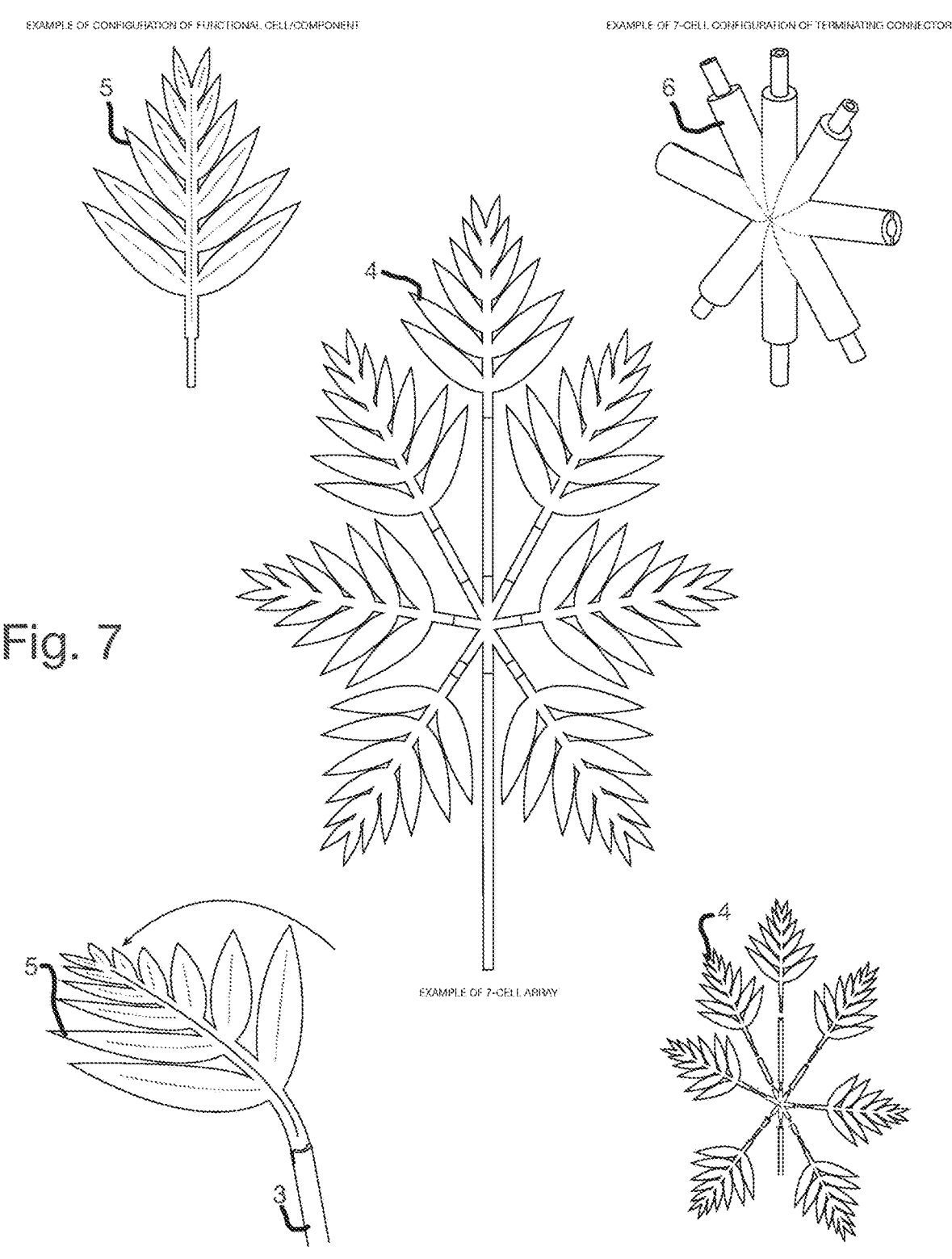
FIG. 7 is a terminating connectors and example of cell/component configuration.
Figure 8:
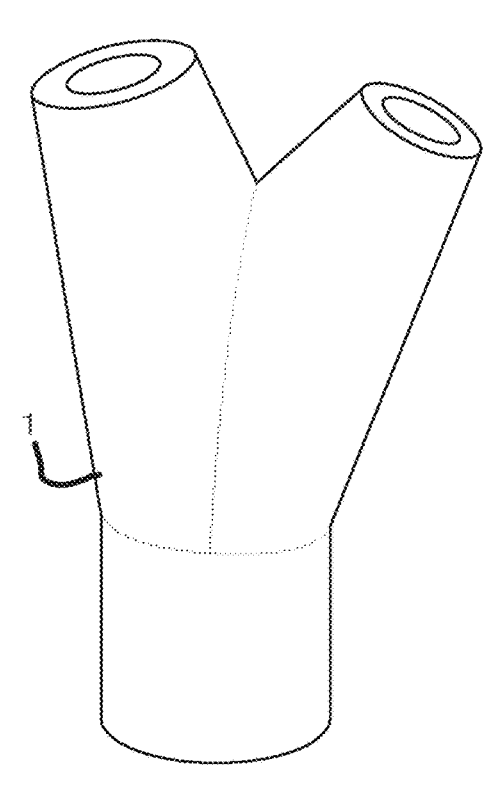
FIG. 8 is a branch connector.
Figure 9:
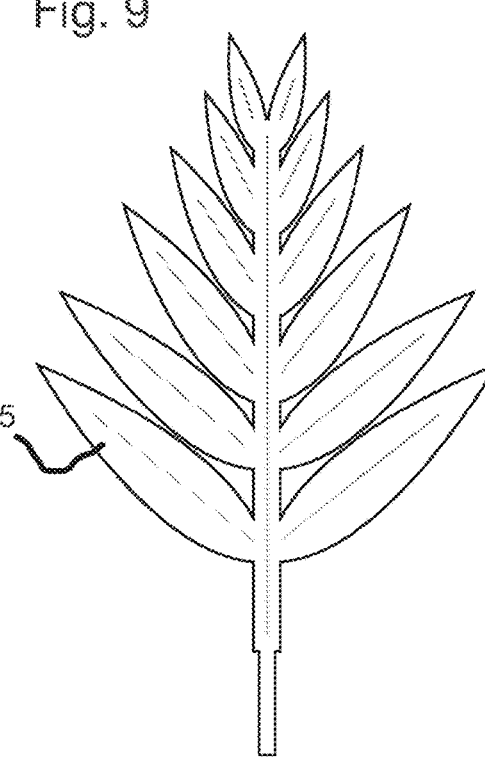
FIG. 9 is an example of functional cell/component form.
Figure 10:
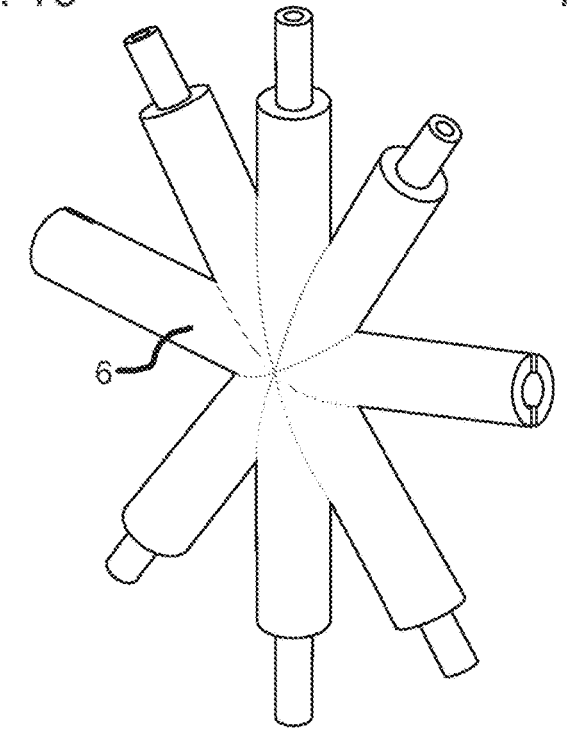
FIG. 10 is a terminating connector.
Figure 11:
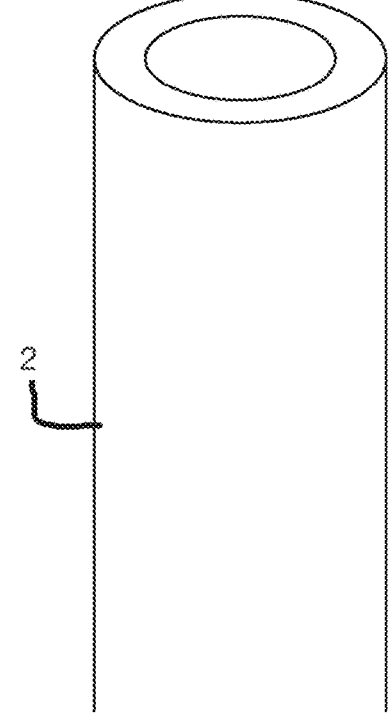
FIG. 11 is a shaft/pin (shafts are also pins of different size).

1. Branch connector
2. Pin
3. Shaft
4. Example of seven cell/component array
5. Example of functional cell/component
6. Terminating connector with seven cell/component connections

DETAILED DESCRIPTION OF THE INVENTION

The design of this particular installation is the first mounting system that utilizes a fractals algorithm which is relatively new field historically. The installation is designed specifically for a single function: to increase surface area with maximum efficiency. It mimics any many forms found in nature that utilize a branching system to achieve this objective. Even though there are just few differently-shaped components in this installation, the fractal-method of construction eventually results in high enough complexity to give the installation ability to perform this function, even though all the shafts that comprise the bulk of its structure are straight, uniform, and either easily manufactured, or already readily available—it is an efficient apparatus which provides a vastly lower cost method for increasing surface area available for existing and future cells and components that benefit from increased surface area for their function.

The installation both fractals to achieve its configuration. A fractal is a very simple algorithm, usually a set of instructions to simply rotate, scale, repeat and little else. A small change in these instructions, results in a very different overall configuration; when a computer is given these instructions to scale and rotate shapes, it can produce very complex configurations which often resemble naturally occurring phenomena. If the numbers are themselves resolving, e.g. 45 or 90 degree angles, the instructions would produce a shape that would return to their original position (producing complete shapes such as polygons or squares). With the correct numbers, they can produce highly complex configurations which prove to be very useful. This is the power of the 'right number,' which in fractals, can be an 'atypical' number.

According to Da Vinci's 'area preserving rule,' for branches, the total area of the cross-sections of smaller branches that follow a larger branch, are approximately the same, or less, than the area of the cross section of the preceding branch-therefore the branching system's overall mass and volume never increases with length or distance; it is only divided, meaning that the volume, and mass of the overall system is the same as if it were a single shaft with the same dimensions as the largest shaft. Another way of putting this, is that the combined cross-sectional area of all the smallest shafts at their termination points, together are not greater than that of the largest shaft. This simple concept is one of the fundamental principles for the installation. Da Vinci did not produce instructions to describe a three-dimensional configuration with rotating branches; this requires a fractal algorithm which instructs the connections of the branches to 'scale and rotate.'

Existing mounting installations require far greater mass and volume to mount cells and components which require increased surface area for their function, because these cells/components are in a single piece, or unit. Such structures are typically very heavy, as much as ten times more materials and mass in order to keep these cells/components fixed in position. They also contain scores, if not hundreds of different manufactured or custom components including screws, nuts, bolts, brackets, and other supports required to maintain the dimensional stability and uniformity (flatness) of a single flat surface. These cells/components are often very thin themselves, sometimes as thin as paper. Even so, their reinforcement can require several inches of structural reinforcement to keep a single thin membrane flat over a large single area, which is incredibly disproportionate. Scale itself dictates that this is necessary, as the membrane of the cells/components may collapse under their own weight otherwise. If we change the scale, we can remove the need for membrane reinforcement entirely; just as it would be impossible to support a large membrane without reinforcement (a piece of paper the size of a flag, blanket or bedsheet)

but we could easily hold a playing card in our hands without the need for any reinforcement at all. A change in scale, changes the rules.

Also unlike a traditional mounting system which faces the same direction constantly, all the cells/components on this installation are distributed uniformly in all directions. Traditional mounting systems are at a disadvantage in this regard. A distributed mounting system facing in all directions produces many benefits, and though there are mounting systems which can maneuver their mounted components into different positions based on their individual requirements, these same systems require very many more components than even a traditional mounting installation; they have moving parts, and depend on mechanics to maintain functionality. These mounting systems come at an even greater cost and less efficiency than this invented system that utilizes sheer brute force of numbers at low cost, greater efficiency, and the multiple redundancy of increased number of individual cells/components to achieve the same result. Each cell/component, since it requires no reinforcement to remain fixed and stable, can be exposed on both sides, unobstructed by its own reinforcement, doubling is effectiveness, further increasing this efficiency.

Due to the simplicity of the installation, and because of its fewer components, decreased material usage and mass compared to traditional mounting installations of the same overall size, there is the potential for greater longevity; the cells/components can be updated or replaced without the traditional difficulty of detaching them from their reinforcement structures. There are no bolts, screws or brackets which could oxidize, break, or need to be replaced. 100% of the mounting system is accessible at all times without costly and timely deinstallation or reinstallation.

The availability of a large amount of surface area at lower cost and greater efficiency, lends itself to countless applications.

I claim:

1. An apparatus comprising:
a plurality of connectors of progressively decreasing size, each of the connectors being Y-shaped, each of the connectors including a first arm, a second arm being integrally formed with the first arm, and a third arm being integrally formed with the first arm and the second arm, wherein:
each of the first arm, the second arm, and the third arm includes a flat end face having an outer diameter;
the outer diameter of the flat end face of the second arm is smaller than the outer diameter of the flat end face of the first arm;
the outer diameter of the flat end face of the third arm is smaller than the outer diameter of the flat end face of the second arm; and
the outer diameter of the flat end face of the first arm of each of the plurality of connectors matches the outer diameter of one of the second arm and the third arm of a larger one of the plurality of connectors;
a plurality of shafts, each of the shafts being connectable to a respective one of the connectors; and
a plurality of functional components, each of the functional components being configured to be coupled to branching structures formed by the shafts and the connectors.

2. The apparatus of claim 1, wherein:
the functional components are solar energy collectors; and
each of the connectors and the shafts are hollow for passage of electrical lines.

3. The apparatus of claim 1, wherein the functional components are communication components.

4. The apparatus of claim 1, wherein the functional components are lighting components.

5. The apparatus of claim 1, wherein the functional components are sensors.

6. The apparatus of claim 1, wherein the functional components are shade structures.

7. The apparatus of claim 1, wherein:

the functional components are water collecting structures; and each of the connectors and the shafts are hollow for passage of water collected by the functional components.

8. The apparatus of claim 1, wherein each of the shafts is cylindrical and has a diameter that matches the diameter of the flat end face of a respective one of the first arm, the second arm, and the third arm of a respective one of the connectors.

9. The apparatus of claim 1, further comprising a plurality of pins, wherein:

each of the connectors and the shafts are hollow; and each of the pins is insertable to connect each of the shafts with a matching one of the first arm, the second arm, and the third arm of a respective one of the connectors.

10. The apparatus of claim 1, wherein the plurality of connectors comprises at least six connectors.

\* \* \* \* \*